United States Patent [19]

Schonherr et al.

[11] 4,125,266

[45] Nov. 14, 1978

[54] LIP SEALING RING AND METHOD FOR ITS MANUFACTURE

[75] Inventors: Wolf-Dieter Schonherr, Leverkusen; Karl-Heinz Wolfert, Burscheid; Veit Lachmann, Monheim, all of Fed. Rep. of Germany

[73] Assignee: Goetzewerke Friedrich Goetze AG, Burscheid, Fed. Rep. of Germany

[21] Appl. No.: 854,222

[22] Filed: Nov. 23, 1977

[30] Foreign Application Priority Data

Nov. 25, 1976 [DE] Fed. Rep. of Germany ....... 2653457

[51] Int. Cl.$^2$ ............................................. F16J 15/32
[52] U.S. Cl. .................................. 277/153; 277/179; 277/DIG. 6; 156/329; 156/308; 277/152
[58] Field of Search .............. 277/152, 153, 157, 163, 277/165, 179, 234, 235 A, DIG. 6; 156/182, 306–309, 329

[56] References Cited

U.S. PATENT DOCUMENTS

| 2,697,623 | 12/1954 | Mosher | 277/179 |
| 2,837,359 | 6/1958 | Corsi | 277/153 |
| 3,022,196 | 2/1962 | Jenkins et al. | 156/329 X |
| 3,099,454 | 7/1963 | Walinski | 277/152 X |
| 3,362,719 | 1/1968 | McCormick | 277/153 X |
| 3,440,122 | 4/1969 | McCormick | 156/329 |

FOREIGN PATENT DOCUMENTS

| 1,264,656 | 10/1968 | Fed. Rep. of Germany | 156/329 |
| 962,097 | 6/1964 | United Kingdom | 277/153 |

Primary Examiner—Robert S. Ward, Jr.
Attorney, Agent, or Firm—Spencer & Kaye

[57] ABSTRACT

In a lip sealing ring made of two elastomer materials including, a first elastomeric material made from a non-fluoroelastomer, a second elastomeric material made of a fluoroelastomer and serving as the sealing lip, and an embedded reinforcing metal ring, the improvement wherein the non-fluoroelastomer material is an acrylelastomer consisting of a terpolymer of ethylene, methylacrylate and a carboxyl containing monomer, with the sealing lip portion and the non-fluoroelastomer portion being vulcanized to the metal ring with a binder comprised of a mixture of monomeric silanes.

6 Claims, 1 Drawing Figure

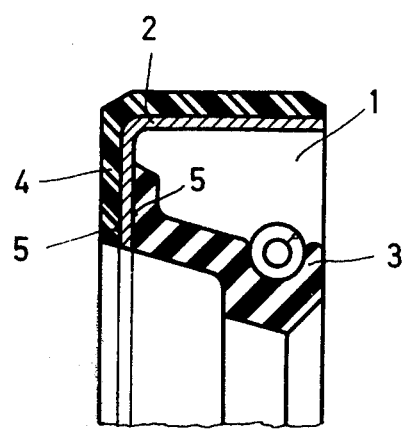

LIP SEALING RING AND METHOD FOR ITS MANUFACTURE

BACKGROUND OF THE INVENTION

The present invention relates to a lip sealing ring of elastomer material having an embedded metallic reinforcing ring and a sealing lip of a fluoroelastomer, and to a method of manufacturing such a ring.

Lip sealing rings, such as, in particular, sealing rings for rotating shafts or reciprocating rods usually are made of elastomer materials and contain embedded metal rings as reinforcements. In many cases, however, the sealing rings are subjected to high thermal and chemical stresses and in such cases the elastometric portions of the sealing rings are made entirely of fluoroelastomers which are known to be able to withstand high chemical and thermal stresses.

Due to the high cost of the basic fluoroelastomer material, however, the sealing rings made entirely of fluoroelastomers are comparatively rather expensive. It has therefore been proposed, in British Pat. No. 962,097, to make only the actual sealing lip portion on which the high thermal and chemical stresses are exerted, of the fluoroelastomer, while the remaining elastomeric region of the sealing ring is made of a more economical natural or synthetic rubber. Such sealing rings are much less expensive with respect to the elastomer materials employed, but problems have arisen in attaining a good connection between the two differing elastomer materials and possibly the metal ring inserts. Thus, the required adhesion is realized according to British Pat. No. 962,097 by separate process stages, in which the fluoroelastomer sealing lip is first vulcanized to the metal ring and then the preshaped remaining portion of, in this case, nitrile rubber is vulcanized on. Such two-stage vulcanization complicates the manufacturing process and in principle the cost advantage attained by the use of different elastomer materials is more than compensated, and the sealing ring becomes more expensive than a ring made of solid fluoroelastomers. On the other hand, good adhesion of the various materials to one another is an absolute requirement for proper functioning of a lip sealing ring.

SUMMARY OF THE INVENTION

It is therefore a primary object of the present invention to provide a lip sealing ring having a sealing lip of a fluoroelastomer, a remaining elastomeric portion of an inexpensive elastomer, and a metallic reinforcing ring, where the sealing ring can be manufactured economically and easily with good adhesion of the various materials to one another.

A further object of the present invention is to provide a method for producing such a lip sealing ring.

Additional objects and advantages of the present invention will be set forth in part in the description which follows and in part will be obvious from the description or can be learned by practice of the invention. The objects and advantages are achieved by means of the processes instrumentalities and combinations particularly pointed out in the appended claims.

To achieve the foregoing objects and in accordance with its purpose, the present invention, as embodied and broadly described provides a lip sealing ring made of two elastomer materials including a first portion made of a first elastomeric material which is a non-fluoroelastomer, a sealing-lip portion made of a fluoroelastomer, and an embedded reinforcing metal ring, wherein the non-fluoroelastomer material is an acrylelastomer consisting of terpolymer of ethylene, methylacrylate and carboxyl containing monomer, with the sealing lip portion and the non-fluoroelastomer portion being vulcanized to the metal ring with a binder comprised of a mixture of monomeric silanes.

Preferably, in the lip sealing ring of the present invention, the metal ring is arranged to serve as a separating ring between the non-fluoroelastomeric portion and the sealing lip portion so that the fluoroelastomer and the acrylelastomer do not contact with each other.

The lip sealing ring structure according to the present invention is based on the inventive realization that a good vulcanization and bond between all parts is possible in a single economical vulcanization process step if certain elastomer materials, a certain binder and a certain arrangement of the metallic insert ring are used.

In the method of the present invention, the binder comprised of the mixture of monomeric silanes is interposed between the metal ring, and the fluoroelastomer and is interposed between the metal ring and the non-fluoroelastomer, and the fluoroelastomer and non-fluoroelastomer are simultaneously vulcanized to the metal ring.

Preferably, the metallic ring is arranged to serve as a separating ring between the non-fluoroelastomer portion and the fluoroelastomeric sealing lip portion.

The arrangement of the metallic insert ring according to the present invention as a separating ring between the non-fluoroelastomeric portion and the fluoroelastomeric sealing lip portion eliminates points of contact between the two elastomer materials right from the start, and there are only points of contact between the elastomers on the one hand and the metal on the other hand.

Since the sealing lip is required to consist of a fluoroelastomer, it is necessary to use a special binder which binds the fluoroelastomer to the metal. A known binder on the basis of monomeric silanes, and described in U.S. Pat. No. 3,022,196 issued Feb. 20th, 1962 to Jenkins et al, and in German Patentschrift 1,264,656, both of which are hereby incorporated by reference, is used for this purpose. The present invention further provides an inexpensive elastomer material which is a non-fluoroelastomer and which can simultaneously be vulcanized to the metal ring by means of the above-mentioned binder. In this connection, it has been found that only an acrylate elastomer, consisting of a terpolymer of ethylene, methylacrylate and a carboxyl containing monomer is suited for this purpose. All other materials known in practice which are based on synthetic or natural rubber do not exhibit sufficient adhesion to the metal insert ring if the sealing lip portion of fluoroelastomer is simultaneously vulcanized on with the aid of the above-mentioned binder. Consequently, only the combination of materials provided by the present invention permits economic manufacture of the sealing ring according to the invention in a single-stage vulcanization process.

It is to be understood that both the foregoing general description and the following detailed description are exemplary, but are not restrictive of the invention.

BREIF DESCRIPTION OF THE DRAWING

The sole FIG. of the drawing shows one embodiment of a lip sealing ring made according to the teachings of the present invention.

DETAILED DESCRIPTION OF THE INVENTION

Referring to the drawing, there is shown a shaft lip sealing ring I which has a metallic reinforcement 2 which simultaneously serves as a separating ring. A sealing lip portion 3 at the inner periphery consists of a fluoroelastomer. The remaining portion 4 at the outer periphery consists, according to the invention, of a terpolymer of ethylene methylacrylate and carboxyl containing monomer. A binder coating 5 made of a mixture of monomeric silane is applied on all sides of the metal insert ring 2 and binds the lip portion 3 and outer portion 4 to metal ring 2. Metal insert ring 2 is embedded beneath the outer portion 4 and generally has the same shape as outer portion 4.

The binder composition used in the present invention comprises a mixture of an unsaturated silane having the general formula $R_1 - Si(OR)_3$ and an aminoalkyl silane having the general formula $R_2 - Si(R_3)_n(OR)_n$ where R is selected from the group consisting of alkyl groups containing from 1 to 10 carbon atoms and aryl groups; where $R_1$ is an unsaturated aliphatic chain; where $R_2$ is an aminoalkyl group containing from 3 to 10 carbon atoms; where $R_3$ is an alkyl group containing from 1 to 4 carbon atoms and where $n$ is an integer selected from 2 and 3. The preferred form of applying the binder composition is as a free flowing solution of the stated components in a solvent therefor. In bonding the elastomers to the metal ring with the stated composition, the binder composition is interposed between the elastomers and the metal ring surface to which the elastomers are to be bonded, as by applying the binder composition to the metal surface, and the resulting assembly is heated under pressure. The binder composition can be applied, for example, by dipping spraying or brushing.

The combined materials of the binder provide an adhesive composition which produce unusually good bonds between the elastomers and metal.

The metal surface which is bonded to the elastomers is preferably clean and free from loose oxide scale. This may be accomplished by a wide variety of ways well known to those skilled in the art. For example, the metal surface may be first degreased as by dipping the metal ring in a degreasing solution or by subjecting the metal ring to vaporized degreasing material such as trichloroethylene. Following this degreasing operation, the metal ring may be further cleaned as by blasting the surface with conventional material such as steel shot, grit, sand or the like.

As stated, the binder composition used in the present invention comprises a mixture of unsaturated silane and an aminoalkyl silane as defined above. Referring specifically to the unsaturated silane it will have, as stated, the general formula $R_1 - Si(OR)_3$. $R_1$ is an unsaturated hydrocarbon chain (including halogen substituted unsaturated hydrocarbon chains). The unsaturated chain may be open or closed, that is to say, it may be an unsaturated open aliphatic chain or an unsaturated cycloaliphatic chain. At least one double bond will be present in the chain, and the chain will generally contain from about 2 to about 10 carbon atoms. Examples of such unsaturated hydrocarbon chains and halogen substituted derivatives thereof are vinyl, chlorovinyl, cyclohexenyl, bicycloheptenyl, butenyl, chlorobutenyl, cyclopentadienly, chlorocyclohexenyl, dichlorocyclohexenyl, dichlorobutenyl, allyl, chloroallyl, decenyl, the radical produced by reacting dicyclopentadiene with vinyl trialkoxysilanes, and the like. In the preferred compounds $R_1$ will be a vinyl group. In the foregoing formula R will be an alkyl group, generally containing from 1 to 10 carbon atoms, such as methyl, ethyl, propyl, butyl, octyl, decyl, and the like or an aryl group, especially a phenyl group. In the preferred compounds, R is a lower alkyl group, most usually ethyl. In this connection, vinyl triethoxysilane has been found to be particularly advantageous.

Referring to the amino alkyl silane component of the binder used in the present invention, this material will have the general formula $R_2 - Si(R_3)_{3-n}(OR)_n$. In this formula R will be as defined above in connection with the unsaturated silane. $R_2$ will be an aminoalkyl group generally containing from 1 to 10 carbon atoms. Examples of such groups are aminoethyl, aminopropyl, aminobutyl, aminooctyl, aminodecyl, and the like. The compound may contain either two or three OR groups and when the compounds contains three OR groups there will be no $R_3$ group. However, when the compound contains two OR groups there will be an $R_3$ group and $R_3$ may be a lower alkyl group, generally containing from 1 to 4 carbon atoms, such as methyl, ethyl, propyl, butyl, and the like. Of the aminoalkyl silanes, those containing three OR groups are preferred. In connection with the foregoing gamma aminopropyl triethoxy silane has been found to be particularly advantageous.

The relative proportion of unsaturated silane to aminolkyl silane present in the binder composition may vary somewhat from about nine parts by weight of aminoalkyl silane to about one part of unsaturated silane down to about one part of the former per nine parts, by weight, of the later. Compositions in which the proportion of aminoalkyl silane to unsaturated silane is between about 1:1 and about 9:1 give good results. An especially advantageous combination in this connection in one which ther are about two parts by weight of aminoalkyl silane per part of unsaturated silane.

For application of the binder composition, the binder composition will generally be in the form of a solution of the stated components. Generally speaking, any solvent for the binder components which is also miscible with water may be used, such as alcohols, glycols, ketones, glycol ethers, and the like may be used. Of the solvent systems for the binder compositions, aqueous alcohol, either methyl alcohol, ethyl alcohol or isopropyl alcohol, in which the alcohol predominates, is especially advantageous. The concentration of solids, based on the weight of the stated principle binder components, may vary somewhat depdending largely upon the method of application selected, and the solids concentration in the solution may be as low as about 1%, particularly when the solution is applied by spraying. The solids concentration may range well above this figure, even up to about 75%, by weight. Preferably, the concentration, for application by dipping, is about 8 and about 14%.

The pH of a solution of the stated binder components may be 9 or greater. It is preferred, however, that the pH be adjusted to below 8.5. The pH may range down to about 1. It is preferred, generally, that the pH be adjusted to within the range of about 7 to about 8.5. Certain of the principal components may be sufficiently acid to provide the desired acidity. For example, α-chlorovinyl trichoxysilane is sufficiently acid to provide an acid pH.

The adjustment of the pH, generally speaking, can be accomplished through the use of any acid or acidic material that is compatible with the system so that the components remain in solution. That is to say, the acid material employed should not itself be insoluble in the solution or form, with one or more of the other principal components, a product insoluble in the solution. No difficulty will be encountered in selecting a pH having acid material meeting the foregoing requirement. Hydrochloric acid has been found to be especially advantageous. Nitric acid, β-carbethoxyethyltriethoxysilane and β-carbethoxypropylmethyldiethoxysilane can also be used.

When bonding the elastomers to the metal ring, generally speaking, a substantially dry film or the binder composition is interposed between the elastomers and the metal surface, the elastomers and metal being brought together and heated under pressure. In employing the binder composition, it may be applied either to the elastomers or to the metal ring, preferalby the latter, following which the binder composition is permitted to dry substantially.

With respect to the bonding of the elastomers to the metal ring, the temperatures employed during the bonding operation may vary somewhat depending upon the nature of the elastomers. However, in general, temeperatures ranging between about 230° and 350° F., will be employed, Sufficient time will be allowed to provide the desired cure of the bond and the time may range from about 10 to about 40 minutes. The pressure employed may also vary and may be as low as that merely required to provide intimate contact, that is, a few pounds per square inch. The upper limit of pressure is not critical and pressures as high as a few thousand pounds per square inch may be employed. The bond provided by this hot pressing operation may be further improved by additional curing at higher temperatures for longer periods of time. For example, following this pressing operation, the assembly may be heated to from about 300° to about 500° F. for several hours as by placing it in an oven through which hot air is circulated. During the bonding operation, the fluoroelastomer and non-fluoroelastomer are vulcanized.

The non-fluoroelastomer used in the present invention is an acrylelastomer consisting of a terpolymer of ethylene, methylacrylate and carboxyl containing monomer. A suitable acrylelastomer of use in the present invention is sold by E. I. duPont de Nemours & Co. under the trademark VAMAC B 124.

It will be understood that the above description of the present invention is susceptible to various modifications, changes and adaptations, and the same are intended to be comprehended within the meaning and range of equivalents of the appended claims.

What is claimed is:

1. In a lip sealing ring made of two elastomer materials including a first portion made of a first elastomeric material which is non-fluoroelastomer, a sealing lip portion made of a fluoroelastomer, and an embedded reinforcing metal ring, the improvement wherein the non-fluoroelastomer material is an acrylelastomer consisting of a terpolymer of ethylene, methylacrylate and carboxyl containing monomer, with the sealing lip portion and the non-fluoroelastomer portion being vulcanized to the metal ring with a binder comprised of a mixture of monomeric silanes.

2. Lip sealing ring as defined in claim 1 wherein the embedded metallic reinforcing ring is arranged to serve as separating ring between the acrylelastomer portion and the sealing lip portion so that the fluoroelastomer and acrylelastomer do not contact each other.

3. The lip sealing ring of claim 1 wherein the binder consists essentially of a mixture of between about one and about nine parts, inclusive, by weight, of an unsaturated silane having the general formula $R_1 - Si(OR)_3$ and between about one and about nine parts, inclusive, by weight, of an aminoalkyl silane having the general formula $$R_2 - Si(R_3)_{3-n}(OR)_n$$

where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive carbon atoms, where $R_3$ is an alkyl group containing from 1 to 4, inclusive carbon atoms, and where $n$ is an integer selected from 2 and 3.

4. A method for making a lip sealing ring of two elastomer materials including a first elastomeric material made from a non-fluoroelastomer, a second elastomer material made of a fluoroelastomer and serving as the sealing lip, and a reinforcing metal ring, comprising: interposing a binder comprised of a mixture of silanes between the metal ring and the fluoroelastomer, and between the metal ring and the non-fluoroelastomer, and simultaneously vulcanizing the fluoroelastomer and the non-fluoroelastomer to the metal ring, with the non-fluoroelastomer consisting of a terpolymer of ethylene, methylacrylate and carboxyl containing monomer.

5. Method as definded in claim 4 wherein the metallic ring is arranged to serve as separating ring between the non-fluoroelastomeric portion and the fluoroelastomeric sealing lip portion so that the fluoroelastomer and acrylelastomer do not contact each other.

6. Method as defined in claim 4 wherein the binder consists essentially of a mixture of between about one and about nine parts, inclusive, by weight, of an unsaturated silane having the general formula $R_1 - Si(OR)_3$ and between about one and about nine parts, inclusive, by weight, of an aminoalkyl silane having the general formula $$R_2 - Si(R_3)_{3-n}(OR)_n$$

where R is selected from the group consisting of alkyl groups and aryl groups containing from 1 to 10, inclusive, carbon atoms; where $R_1$ is an unsaturated aliphatic chain; where $R_2$ is an aminoalkyl group containing from 3 to 10, inclusive carbon atoms, where $R_3$ is an alkyl group containing from 1 to 4, inclusive carbon atoms, and where $n$ is an integer selected from 2 and 3.

* * * * *